Jan. 9, 1934.　　　　P. E. FENTON　　　　1,943,063
MOLDED BUTTON
Filed April 27, 1933

INVENTOR
Paul E. Fenton,
BY
Fraser, Myers & Manley,
his ATTORNEYS.

Patented Jan. 9, 1934

1,943,063

UNITED STATES PATENT OFFICE 1,943,063

MOLDED BUTTON

Paul E. Fenton, Thomaston, Conn., assignor to Scovill Manufacturing Company, Waterbury, Conn., a corporation of Connecticut Application April 27, 1933. Serial No. 668,178

4 Claims. (Cl. 24—95)

This invention relates to improvements in molded buttons for use on garments and the like.

It is an object of the invention to provide a molded button having a metal fastener-attaching element embedded therein when the button is made, whereby the button may be readily attached to a garment by means of a fastener-attaching machine.

It is a further object of the invention to provide a button of the above-described character having a centrally-disposed prominence on its back or rear face whereby it may be tightly secured to a garment by machine-applied mechanical fastening means and yet leave a clear space between the rear surface of the outer part of the button and the surface of the article to which it is applied, to allow for the thickness of the material beneath the button after it has been thrust through a buttonhole.

The button may be of any desired size and of a shape such as to present an artistic appearance, whereas the metal fastener-attaching element may be of a construction such as to receive any of the well-known forms of setting eyelets, tacks, staples, or other suitable mechanical button-attaching devices, without throwing any damaging strain upon the molded portion of the button.

In the accompanying drawing illustrating various modified forms of the invention,—

Figure 7:
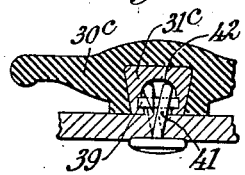
Figure 8:
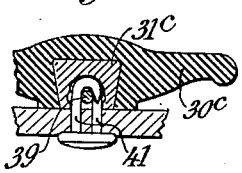
Figure 9:
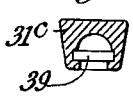
Figure 10:
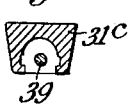
Figure 11:
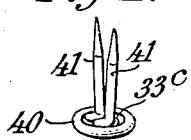

Figs. 7 to 11, inclusive, illustrate another modified form of the invention. In Figs. 7 and 8 the button is represented as having been applied to an article or garment, by transverse sectional views of which the respective cutting planes intersect at an angle of 90 degrees. Figs. 9 and 10 are similar cross-sectional views of the attaching socket embedded in the button illustrated by Figs. 7 and 8. Fig. 11 is a perspective view of a two-pronged tack adapted for use as the attaching element of the button illustrated by Figs. 7 and 8.

Figure 12:
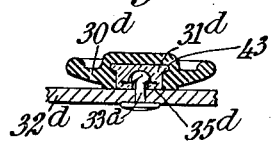

Fig. 12 is a transverse cross-sectional view of another modified form of the invention.

Figure 13:
Figure 14:

Figs. 13 and 14 are respectively a transverse cross-sectional view and a plan view of the socket embedded in the button illustrated by Fig. 12.

Figure 15:

Fig. 15 is a side view of a tack adapted for use as the attaching element of the button illustrated by Fig. 12.

Figure 16:
Figure 17:

Figs. 16 and 17 respectively are transverse cross-sectional views of slight modifications of the form of the invention illustrated by Fig. 12.

Figure 6:
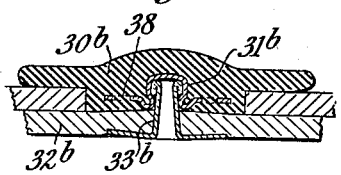
Fig. 6 is a view similar to Fig. 4 illustrating another modified form of the invention.
Figure 18:
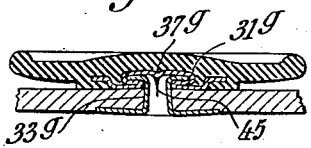

Fig. 18 is a transverse cross-sectional view of a modification of the form of the invention illustrated by Fig. 6.

Figure 20:
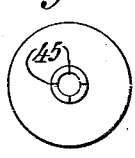
Figure 19:
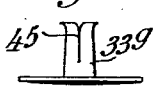

Figs. 19 and 20 are respectively a side view and a plan view of a setting eyelet adapted for use as the attaching element of the button illustrated by Fig. 18.

Figure 21:
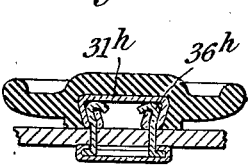

Fig. 21 is a transverse cross-sectional view of a modification of the form of the invention illustrated by Figs. 7 and 8.

Figure 22:
Figure 23:

Figs. 22 and 23 are respectively a cross-sectional view and a plan view of the socket embedded in the button illustrated by Fig. 21.

Figure 24:

Fig. 24 is a side view of a staple adapted for use as the attaching element of the button illustrated by Fig. 21.

Figure 1:
Figure 1 is a transverse cross-sectional view of a molded button having a metal socket embedded therein of a form adapted to be secured to an article by means of a setting eyelet like the one illustrated in Fig. 3.
Figure 2:
Fig. 2 is a side view of the socket which forms a part of the button illustrated in Fig. 1.

The invention as illustrated by Fig. 1 comprises a button consisting of a body portion 30 molded from material of any suitable character and having embedded therein during the molding operation a fastener-attaching element 31, which may, as indicated, comprise a metal socket of the form shown in side view in Fig. 2.

Figure 4:
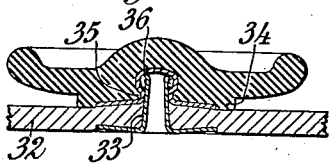
Fig. 4 is a transverse sectional view of the button illustrated in Fig. 1 drawn to a larger scale and indicated as having been secured to a part of a garment or other article.
Figure 3:
Fig. 3 is a side view of an eyelet adapted for use as the securing means of the button illustrated in Fig. 1.

The button illustrated by Fig. 1 may be secured to a portion 32, Fig. 4, of a garment or other article, by means of a setting eyelet 33 of the form of the one illustrated in side view in Fig. 3, as indicated in cross-section in Fig. 4.

In order to allow sufficient space for the material of the garment or other article surrounding a buttonhole through which the button may be thrust, the button may be provided at its back with a centrally-disposed prominence 34, and the embedded socket 31 may have its open face substantially flush with the rear face of the button, as indicated.

The walls of the socket 31 should be of such strength and form as to serve as an anvil and deflect the portion of the fastening element thrust into the socket during the attaching operation without transmitting and closely localized strain to the immediately adjacent parts of the molded button, and the throat of the socket may be of a restricted diameter, as indicated at 35, to prevent the withdrawal of the deflected portion 36 of the fastening element after the parts have been attached to each other.

The external form of the socket should be such as to key the metal element of the button to the molded body portion and prevent withdrawal. In the form of the invention illustrated by Fig. 4 a type of socket adapted to be thus securely held in the molded part of the button in which it is embedded results from the contraction of the throat of the socket, which reduces its diameter at the surface of the molded button as compared with the dimensions of the socket well within the body portion, as clearly indicated.

A button and button-attaching element of the character of the ones thus far described may be securely clamped to a part of a garment or other article between the setting tool and the anvil of a machine of the general character of the one illustrated in the patent to Warner et al., No. 1,499,270, without danger of breaking the molded button.

It is well known that metal buttons may be secured to garments by machines of the general type of the one referred to in the above-designated patent. The ordinary molded, non-metallic button is not adapted to be secured in the same manner, for the reason that the material of such button is not of sufficient strength to deflect the portion of the fastening element which must be rolled or riveted within the socket of the button. A button embodying the invention herein disclosed combines the strength of the metal button as a means of resisting the strain set up during the operation of mechanical attachment, with the artistic appearance of the molded button, which must ordinarily be attached by the laborious and expensive operation of sewing. The improved button may be firmly clamped to the article, and yet, due to the centrally-disposed prominence on its back, be as freely thrust through the buttonhole in the part of the garment or article on which the button is used as though the button were loosely sewed to the article in the usual manner.

Figure 5:
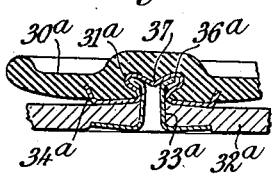
Fig. 5 is a view similar to Fig. 4 illustrating a modified form of the invention.

In the form of the invention illustrated by Fig. 5 the part of the embedded metal fastening element 31$^a$ of the button 30$^a$ which serves as an anvil for the attaching element 33$^a$ may be inwardly curved or depressed, as at 37, to more effectively roll the end portion 36$^a$ as a part of the setting operation. In the form of the invention illustrated by Fig. 5 the prominence 34$^a$ may, if desired, be provided by extending the metal element beyond the rear face of the button to the extent of the thickness of the flange of the fastener-attaching socket, the peripheral portion of which may be embedded within the button as indicated.

In the modified form of the invention illustrated by Fig. 6 the keying or anchoring of the fastener-attaching element 31$^b$ in the molded button 30$^b$ is enhanced by providing the attaching element with a perforated flange 38 of a form such as to be embedded within the body portion of the button as indicated. The button may be secured to a garment 32$^b$ by a fastening element 33$^b$ in the usual manner.

The form of the invention illustrated by Figs. 7 to 11, inclusive, differs from those thus far described in that the metal fastener-attaching element 31$^c$, which is embedded in the molded button 30$^c$, is provided with a cross-pin 39, and the attaching element 33$^c$ comprises a head 40 and a pair of prongs 41 which may be deflected or rolled in opposite directions by the anvil 42, as clearly indicated in Figs. 7 and 8.

In the form of the invention illustrated by Figs. 12 to 15, inclusive, the fastener-attaching element 31$^d$ is keyed to the molded button 30$^d$ by means of a plurality of radially-extending lugs 43 which tend to prevent relative rotational movement between the button and the fastener-attaching element as well as the withdrawal of the fastening element from the button. In this form of the invention the fastener-attaching element is provided with a cylindrical marginal flange 44, Fig. 13, which is rolled inwardly to the position indicated at 35$^d$ in Fig. 12. The button may be secured to a garment or article 32$^d$ by means of a tack fastener 33$^d$ of the type illustrated by Fig. 15.

The form of the invention illustrated by Fig. 16 differs from that illustrated by Fig. 12 in that the fastener-attaching element consists of a flanged cylindrical body portion 31$^e$ and a separate anvil 42$^e$. This construction makes it possible to use materials of different physical properties in the construction of the anvil and body portion of the fastener-attaching element.

In the modified form of the invention illustrated by Fig. 17 the fastener-attaching element differs from the forms heretofore described in that the part 42$^f$ which serves as an anvil is a plane rather than a curved surface and the attaching element is provided with an annular inturned lip to form the restricted throat 35$^f$.

Figs. 18, 19 and 20 illustrate a form of the invention adapted for use in the manufacture of a relatively thin molded button. This form differs from the form illustrated by Fig. 6 in that the cavity of the attaching socket 31$^g$ is flattened and depressed at the center as indicated at 37$^g$, and the shank of the attaching eyelet 33$^g$ is slitted axially, as at 45, in order that it may be readily deflected and spread outwardly into the flattened cavity of the socket as indicated.

In the form of the invention illustrated by Figs. 21 to 24, inclusive, the fastener-attaching element 31$^h$ is provided with an inturned flange 46 and the securing element 33$^h$ is provided with a pair of fingers adapted to pass through openings 47 in the fastener-attaching element and be rolled inwardly over the margins of the flange 46, as indicated at 36$^h$ in Fig. 21.

The various modifications of the invention which have been illustrated and described clearly indicate that it is not limited in its application to any one particular type of mechanical attachment, but that the molded button may be satisfactorily secured to a garment or other article by means of any of the well-known forms of machine-applied fastening elements by appropriately selecting the form of fastener-attaching element which is embedded within the body portion of the button.

Although the invention has been disclosed in its preferred form in accordance with which the metal fastener-attaching element is embedded within the button during the course of manufacture as a part of the molding operation, it is to be understood that it might satisfactorily be united with the button by first providing a slightly undercut recess in its rear surface and then expanding the socket or other form of fastener-attaching element into the recess either prior to or as a part of the operation of securing the button and its mechanical attaching means to a garment.

The invention is not intended to be limited to the various forms herein selected for purposes of illustration, but should be regarded as comprising modifications and variations thereof within the scope of the appended claims.

What is claimed is:

1. A molded button having a centrally-disposed prominence on its back and a metal attaching element securely embedded therein at the center of the prominence.

2. A molded button having a centrally-disposed prominence on its back and a metal fastener-attaching socket embedded therein with its open face substantially flush with the surface of the button at the center of the protuberance.

3. A molded button having a centrally-disposed prominence on its back and a socket element of a button-attaching means embedded therein and covered by the material at its face portion, the throat of the socket being exposed at the back of the button within the area of its protuberant portion so as to be accessible for the insertion of a complemental attaching element.

4. A button, as defined by claim 3, of which the cavity of the socket element has a contracted fastener-retaining throat and a wall portion adapted to serve as a fastener-deflecting anvil.

PAUL E. FENTON.